United States Patent [19]

Nels

[11] 4,260,047
[45] Apr. 7, 1981

[54] FRICTION DISC AND METHOD OF MAKING SAME

[75] Inventor: Terry E. Nels, Xenia, Ohio

[73] Assignee: General Motors Corporation, Detroit, Mich.

[21] Appl. No.: 99,487

[22] Filed: Dec. 3, 1979

[51] Int. Cl.³ .................... F16D 13/00; F16D 13/60
[52] U.S. Cl. .................... 192/70.14; 29/416; 192/107 R; 264/29.1; 264/67; 264/118; 264/126; 264/157; 228/141.1; 228/170; 228/173 C
[58] Field of Search .............. 192/107 R, 70.14; 264/29.1, 67, 109, 111, 118, 126, 157; 29/416, 437; 156/256, 264, 245; 228/141.1, 170, 173 R, 173 C

[56] References Cited

U.S. PATENT DOCUMENTS

| | | | |
|---|---|---|---|
| 2,884,693 | 5/1959 | Wagner | 228/170 |
| 3,066,631 | 12/1962 | Geary | 29/416 |
| 3,073,424 | 1/1963 | Russell | 192/107 R |
| 3,164,038 | 1/1965 | Ahlbin | 29/416 |
| 3,250,349 | 5/1966 | Byrnes et al. | 192/107 R |
| 3,306,401 | 2/1967 | Dasse | 192/107 R |
| 3,316,138 | 4/1967 | Taylor | 156/278 |
| 3,414,450 | 12/1968 | Graves | 156/256 |
| 3,422,936 | 1/1969 | Marcheron | 192/107 R |
| 3,476,228 | 11/1969 | Pritchard | 192/107 R |
| 3,758,152 | 9/1973 | Lake | 29/416 |
| 3,867,491 | 2/1975 | Marin | 264/29.1 |
| 3,904,000 | 9/1975 | Berger | 192/107 R |
| 3,937,303 | 2/1976 | Allen et al. | 192/107 R |
| 4,197,352 | 4/1980 | Emmett et al. | 156/245 |

OTHER PUBLICATIONS

U.S. Patent Office Classification Definition, "Class 29, Metal Working" GPO, Wash., D.C. (2/75).

Primary Examiner—Jerome W. Massie
Attorney, Agent, or Firm—Donald F. Scherer

[57] ABSTRACT

A friction disc for a clutch or brake is formed from a plurality of arcuate segments. The segments are stamped from a rectangular sheet of pregrooved friction material, interconnected by integral tab and slot structures to form an annulus, and bonded to an annular metal member.

5 Claims, 7 Drawing Figures

FRICTION DISC AND METHOD OF MAKING SAME

This invention relates to friction discs and methods for making same and more particularly to friction discs made by assembling a plurality of segmented arcuate members.

It is an object of this invention to provide an improved method for manufacturing a friction disc.

It is another object of this invention to provide a friction disc produced by an improved method wherein a pregrooved rectangular sheet of friction material has arcuate segments stamped therefrom, which arcuate segments are interlocked through integral tab and slot structures to form an annular disc which is thereafter bonded to a metal disc member.

It is yet another object of this invention to provide an improved method for manufacturing a friction disc comprising hot-molding a plurality of parallel grooves in a rectangular shape; stamping quarter-circle arcuate segments from said sheet; interlocking said segments to form an annular disc; pregluing either the annular disc, an annular steel plate or both; and bonding the annular disc to said steel plate.

These and other objects and advantages of the present invention will be more apparent from the following description and drawings in which.

Figure 4:
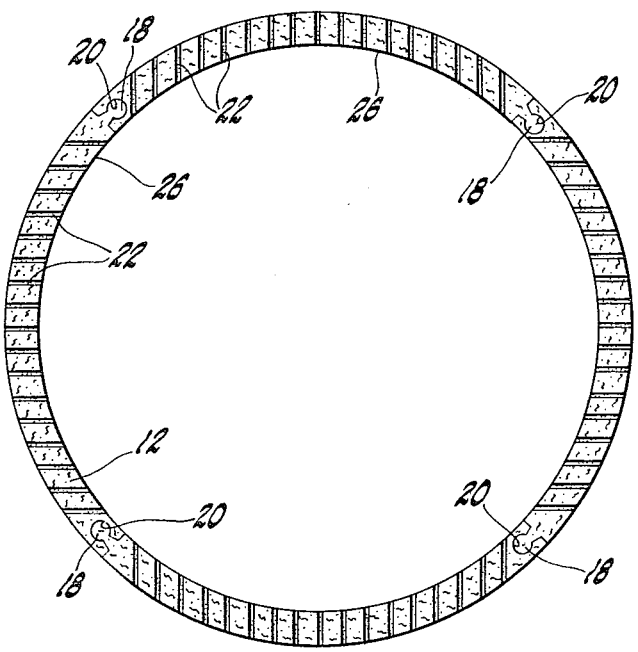
FIG. 4 is an elevational view wherein four of the segments of FIG. 3 have been joined to form a disc.
Figure 5:
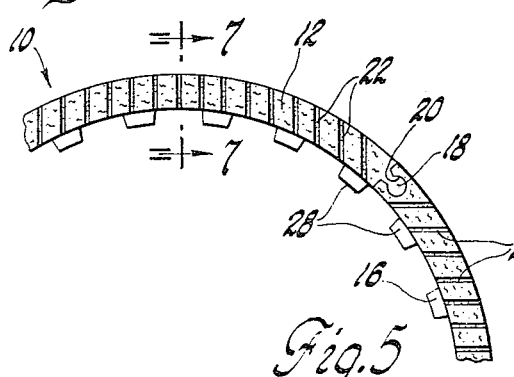
FIG. 5 is an elevational view of a portion of a friction disc.
Figure 6:
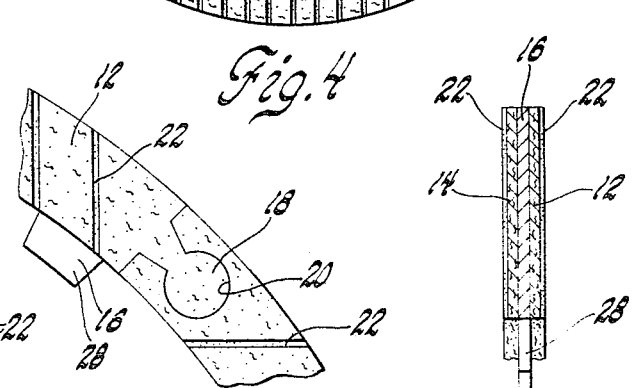
FIG. 6 is an enlarged view showing a portion of FIG. 5.
Figure 7:
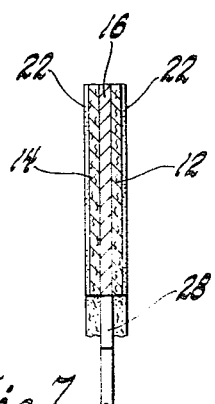
FIG. 7 is a view taken along line 7—7 of FIG. 5.

Referring to the drawings, wherein like characters represent the same or corresponding parts throughout the several views, there is shown a friction disc, generally designated 10, having a pair of friction linings or discs 12 and 14 secured to both sides of a metal or steel annular core plate 16. The friction discs 12 and 14 are comprised of four quarter-circle segments, each of which has a tab 18 and a slot 20 formed thereon to permit interlocking during assembly. Each of the segments making up the linings 12 and 14 has a plurality of grooves 22. In FIGS. 4, 5 and 6, it will be noted that the grooves 22 on adjacent segments are disposed perpendicularly.

Figure 1:
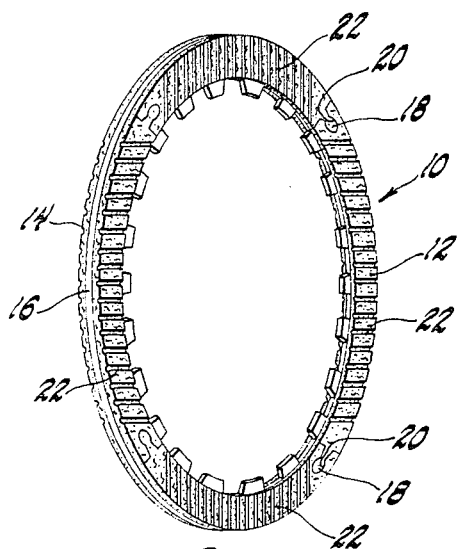
FIG. 1 is a perspective view of a friction disc.
Figure 2:
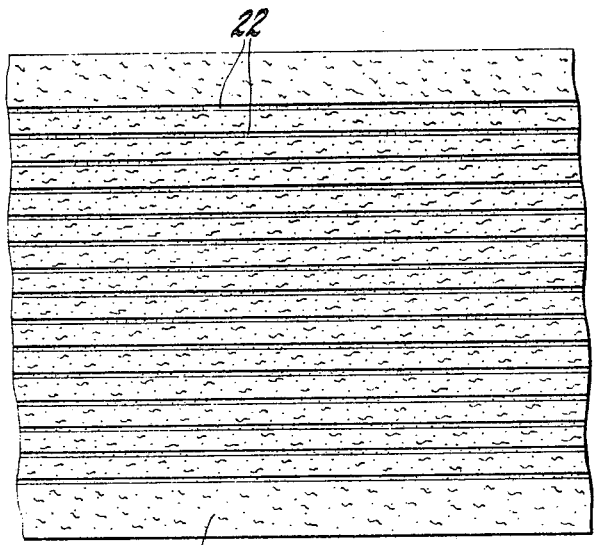
FIG. 2 is a view of a portion of a rectangular sheet of friction material which has been grooved.
Figure 3:
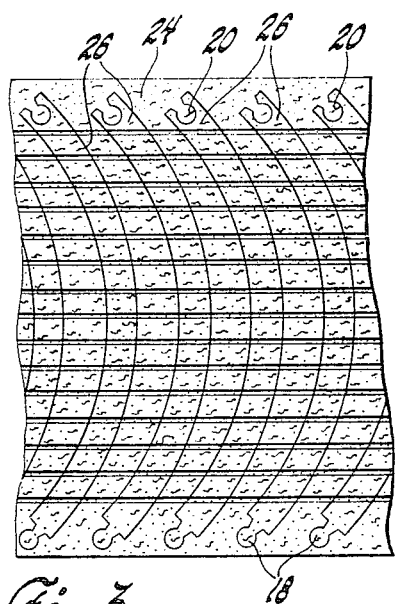
FIG. 3 is a portion of FIG. 2 having quarter-circle arcuate segments stamped therein.

The friction linings 12 and 14 are manufactured through a process which begins with a sheet of rectangular friction material 24 which has a plurality of parallel grooves 22 formed therein by a hot-molding process. Following the grooving of rectangular sheet 24, a plurality of preferably quarter-circle arcuate segments 26 are stamped from the friction material as shown in FIG. 3. Each arcuate segment 26 has the tab 18 formed on one end and the slot 20 formed on the other end. It will be noted in FIGS. 2 and 3, that during the grooving process a border of ungrooved material was left along both of the longitudinal edges of the rectangular sheet 24.

As seen in FIG. 3, the tab 18 and slot 20 are formed in this ungrooved portion of material. After the segments 26 have been stamped, they are joined to form an annular lining, such as 12, by interlocking the tab 18 in the slot 20 on adjacent ends of the segments 26. The linings 12 and 14 are then bonded to a steel plate 16 which has formed thereon a plurality of spline teeth 28. As seen in FIGS. 1, 5, 6 and 7, the linings 12 and 14 are bonded to the steel plate 16 so that the grooved side of the lining 12 or 14 is facing axially outward therefrom.

The bonding or adhesive material used to secure the lining 12 to the metal plate 16 can be any of the conventional bonding materials used for such purposes. The bonding material can be applied to either the friction lining 12 or the steel plate 16, or both to the lining 12 and the plate 16. If the bonding material is applied to the lining 12, it can be done prior to stamping of the segments 26, after stamping of the segments 26 or after the lining 12 has been formed in a disc as shown in FIG. 4. The stamping of the arcuate segments quite obviously saves a considerable amount of wasted friction material since the entire center of the annular lining 12 does not have to be discarded.

The pregrooving of the rectangular sheet 24 provides a simple and efficient method of grooving the friction plate, and it has been found that the perpendicularly disposed grooves on adjacent segments do not affect the efficiency or increase the drag torque of these friction discs when operating as a clutch or brake assembly.

Thus, there is provided a friction disc which is economically manufactured and also provides conservation of materials.

The embodiments of the invention in which an exclusive property or privilege is claimed are defined as follows:

1. A process for manufacturing a friction disc for use in a clutch or brake assembly; the process comprising;
    hot-mold a plurality of parallel grooves at a predetermined depth in one side of a rectangular sheet of friction material;
    stamp a plurality of quarter-circle arcuate segments from said sheet of friction material, said stamping including the formation of a tab and slot at respective ends of each segment;
    interlock, through the tabs and slots, four of the segments to form an annular disc with adjacent segments having the respective grooves therein displaced 90°;
    bond one annular disc with the grooved surface facing axially outward, to each side of an annular metal member to form a friction disc.

2. A friction disc produced by the process of claim 1.

3. A method of manufacturing a friction disc for use in a clutch or brake assembly; the method comprising;
    hot-mold a plurality of parallel grooves at a predetermined depth in one side of a rectangular sheet of friction material;
    stamp a plurality of quarter-circle arcuate segments from said sheet of friction material, said stamping including the formation of a tab and slot at respective ends of each segment;
    interlock, through the tabs and slots, four of the segments to form an annular disc with adjacent segments having the respective grooves therein displaced 90°;
    apply an adhesive to both sides of an annular metal member;
    bond one annular disc with the grooved surface facing axially outward, to each side of the annular metal member to form a friction disc.

4. A method of manufacturing a friction disc for use in a clutch or brake assembly; the method comprising;
- hot-mold a plurality of parallel grooves at a predetermined depth in one side of a rectangular sheet of friction material;
- stamp a plurality of quarter-circle arcuate segments from said sheet of friction material, said stamping including the formation of a tab and slot at respective ends of each segment;
- interlock, through the tabs and slots, four of the segments to form an annular disc with adjacent segments having the respective grooves therein displaced 90°;
- apply an adhesive to the ungrooved side of the annular disc;
- bond one annular disc with the grooved surface facing axially outward, to each side of an annular metal member to form a friction disc.

5. A process of manufacturing a friction disc for use in a clutch or brake assembly; the process comprising;
- hot-mold a plurality of parallel grooves at a predetermined depth in one side of a rectangular sheet of friction material;
- apply a bonding adhesive to the ungrooved side of the rectangular sheet;
- stamp a plurality of quarter-circle arcuate segments from said sheet of friction material, said stamping including the formation of a tab and slot at respective ends of each segment;
- interlock, through the tabs and slots, four of the segments to form an annular disc with adjacent segments having the respective grooves therein displaced 90°;
- bond one annular disc with the grooved surface facing axially outward, to each side of an annular metal member to form a friction disc.

* * * * *